United States Patent Office 3,836,453
Patented Sept. 17, 1974

3,836,453
PROCESS FOR HYDROGENATION-HYDROTREAT-
ING OF HYDROCARBON MIXTURES
Stephen M. Kovach, Ashland, Ralph E. Patrick, Flatwoods, and Ronald A. Kmecak, Ashland, Ky., assignors to Ashland Oil, Inc., Columbus, Ohio
No Drawing. Continuation-in-part of application Ser. No. 133,349, Apr. 12, 1971, which is a continuation of application Ser. No. 769,740, Oct. 22, 1968, both now abandoned. This application July 18, 1972, Ser. No. 272,855
Int. Cl. C10g 23/02
U.S. Cl. 208—143          1 Claim

ABSTRACT OF THE DISCLOSURE

A process for hydrogenation-hydrotreating of hydrocarbon materials, comprising; contacting a hydrocarbon material, such as naphthas, kerosene, cycle oils, gas oils, coal liquids, and particularly a hydrocarbon material containing naphthalene, alkylbenzenes, and alkylnaphthalenes, with a catalyst containing an active hydrogenation-dehydrogenation metal, such as a metal selected from the group consisting of IB, IIB, VB, VIB and VIII of the Periodic System and a basic metal oxide promoter selected from the group consisting of Groups IA, IIA, IV, and rare earth metals of the Periodic System, both deposited on an inert oxide support, such as gamma aluminas, silica-alumina, silica-zirconia, silica-magnesia, etc., at a temperature of about 500 to 900 F., a pressure of about 100 to 3000 p.s.i.g., a liquid hourly space velocity between about 0.1 and 10, and a hydrogen-to-hydrocarbon mole ratio of about 3 to 15 to 1.

CROSS-REFERENCES TO RELATED APPLICATIONS

This is a continuation-in-part of our copending application, Ser. No. 133,349, filed Apr. 12, 1971, which in turn is a continuation of our application Ser. No. 769,740, filed Oct. 22, 1968, both now abandoned but copending at the date of filing Ser. No. 133,349.

BACKGROUND OF THE INVENTION

The present invention relates to a method for the hydrogenation-hydrotreating of hydrocarbon materials. In a more specific aspect, the present invention relates to the hydrogenation-hydrotreating of hydrocarbon materials in the presence of a novel catalyst system.

In the past, the major proportion of hydrocarbon materials has been obtained from petroleum crude oils which are relatively sweet, i.e., containing little or no sulfur, and containing little or no nitrogen. However, at least the domestic supply of such crudes has radically decreased, thereby making the major proportion of today's crude oil supply one which is highly contaminated with nitrogen and sulfur in free or combined form. Sulfur and nitrogen contents of various crude oils can vary from several tenths of one percent to two to three percent. These percentages can be even higher in the processing of shale oils, tar sand liquids, and coal-derived stocks and in the case of coal-derived stocks, the unsaturation is substantially higher.

In addition, because of the drastically reduced domestic supplies of crude oils, the petroleum industry has turned its attention to the upgrading of coal-derived hydrocarbons, shale oils, and many residuals and heavy hydrocarbons stream from petroleum refineries. One method which has been utilized for upgrading such materials to reduce the sulfur and nitrogen content has been hydrogen treatment in the presence of a suitable catalyst. In addition, such hydrogenation in the presence of a catalyst has also been proposed for upgrading many virgin and cracked distillates, such as light and heavy feeds for fluid catalytic cracking, distillate fuels, process oils and the like. Similarly, it is a settled requirement that hydrocarbons derived from coal by carbonization or pyrolysis, or solvent extraction, must be hydrogenated to produce petroleum-type liquids which can be further processed to valuable fuels and chemicals.

The more common catalysts utilized for the above types of upgrading are nickel-molybdate and cobalt-molybdate deposited on alumina carriers. The nickel-containing catalysts are generally utilized for hydrogenation-denitrogenation; while the cobalt-containing catalysts are primarily utilized for hydrogenation-desulfurization. Neither of these catalysts is an outstanding hydrogenation catalyst as compared to precious metal catalysts. On the other hand, an excellent catalyst for hydrogenation is a precious metal, such as platinum on alumina. However, this catalyst is easily poisoned by the impurities previously mentioned such as sulfur, nitrogen, etc.

Two hydrocarbon compounds of great value to the petrochemical industry are benzene and naphthalene. One important source of benzene and naphthalene is from the coking of coal tar, but this process yields a mixture of alkylbenzenes, naphthalene, and alkylnaphthalenes containing high concentrations of nitrogen and sulfur compounds. This mixture must be hydrotreated to remove the nitrogen and sulfur compounds prior to conversion to benzene and naphthalene via hydrodealkylation, but this step ordinarily hydrogenates much of the naphthalene to tetralin. The overall recovery of naphthalene from hydrodealkylation is substantially reduced due to cracking of the tetralins and decalins and the economics of the process are adversely affected.

It is therefore an object of the present invention to provide an improved hydrogenation-hydrotreating process for the treatment of hydrocarbon materials. Another object of the present invention is to provide an improved process for the hydrogenation-hydrotreating of coal liquids. Another object of the present invention is to provide an improved hydrogenation-hydrotreating process for the treatment of hydrocarbon materials which utilizes a novel catalyst system. Still another object of the present invention is to provide an improved hydrogenation-hydrotreating process for the treatment of hydrocarbon materials which simultaneously hydrogenates olefinic hydrocarbons, while desulfurizing and denitrogenating the materials. Still another object of the present invention is to provide an improved process for the hydrogenation-hydrotreating of hydrocarbon materials which utilizes a catalyst of improved activity. Another and further object of the present invention is to provide an improved process for the hydrogenation-hydrotreating of hydrocarbon materials which utilizes a catalyst of decreased coking rate.

Another and further object of the present invention is to provide an improved catalyst whereby mixtures of naphthalene, alkylbenzenes and alkylnaphthalenes with nitrogen and sulfur compounds may be hydrotreated to remove the nitrogen and sulfur compounds but with much less simultaneous hydrogenation of the benzene, naphthalene, and alkylnaphthalenes.

SUMMARY OF THE INVENTION

Briefly, in accordance with the present invention, an improved process for the hydrogenation-hydrotreating of hydrocarbon materials includes contacting the hydrocarbon material with a catalyst comprising an active hydrogenation-dehydrogenation metal and a basic metal oxide promoter, both deposited on an inert oxide support. More specifically, the process comprises contacting the hydrocarbon material with an active metal selected from the group consisting of Groups IB, IIB, VB, VIB and VIII of the Periodic System, and mixtures thereof and a promoter selected from the group consisting of Groups IA, IIA and IV of the Periodic System, the rare earth metals and mixtures thereof. The active metal catalyst and the promoter are deposited on an inert oxide support which is preferably a gamma alumina including the beta, eta, bayerite, and boehmite crystalline forms. However, other aluminas, silica-alumina, silica, silica-magnesia, silica-zirconia, etc. may be employed. Still more specifically this process comprises in one aspect the hydrotreating of hydrocarbon mixtures containing naphthalene, alkylbenzenes and alkylnaphthalenes with undesired nitrogen and sulfur compounds utilizing the aforedescribed catalyst systems.

DESCRIPTION OF THE PREFERRED EMBODIMENTS

Feedstocks which may be processed in accordance with the present invention include the petroleum hydrocarbons from crude oil, such as naphthas, kerosene, light and heavy cycle oil, gas oil, residuals, asphalts, etc.; shale oil derived fractions; liquids derived from the pyrolysis or carbonization of coal, such as coal tar liquids; and liquids obtained from the solvent extraction of coal. Specific compounds and mixtures thereof which may be treated are monoolefins, such as, ethylene, propylene, butene and pentenes, diolefins, such as butadiene and isoprene, and vinyl aromatics, such as, styrene, alpha methyl styrene, and vinyl naphthalene, and hydrocarbon mixtures containing naphthalene, alkylbenzenes and alkylnaphthalenes.

Suitable conditions for the operation of the hydrogenation-hydrotreating process of the present invention include a temperature of about 500 to 900° F., a pressure of about 100 to 3000 p.s.i.g., a liquid hourly space velocity between about 0.1 and 10, and a hydrogen-to-hydrocarbon mole ratio of about 3 to 15 to 1.

The active catalytic metal can include platinum, rhodium, rhenium, palladium, nickel, chromium, cobalt, molybdenum, tungsten, copper, vanadium, cadmium, etc. The active metal portion of the catalyst may be exemplified by the following materials: cobaltmolybdate, nickelmolybdate, nickeltungstate, platinum-nickelmolybdate, rhodium - nickelmolybdate, palladium - nickelmolybdate, platinum-cobaltmolybdate, rhenium, rhenium-nickelmolybdate, rheniumvanadate, nickelvanadate, copperchromate, cadmiummolybdate, etc.

Suitable promoters are tin, lead, calcium, strontium, potassium, cesium, cerium, thorium. Examples of suitable promoters include tin oxide, lead oxide, mixtures thereof, tin oxide plus potassia or cesia, tin oxide plus calcium or strontium oxide, tin oxide plus ceria or thoria, lead oxide plus potassia or cesia, lead oxide plus calcium or strontium oxide, lead oxide plus ceria or thoria, tin oxide and lead oxide plus any of the Group IA, Group IIA, or rare earth metal oxides. The preferred inert oxide support is a gamma alumina of the beta, eta, boehmite nd bayerite crystalline form. Other aluminas, silica-alumina, silica, silica-magnesia, silica-zirconia, etc. are also useful.

The catalyst may be prepared by techniques which are well known in the art. For example, these can include coprecipitation or impregnation techniques. One can employ extrudates or pellets for the impregnation of the active metal and promoter or powders followed by pelletization or extrusion to yield the finished catalyst. The active metal and the promoter are added by the use of water-soluble salts, such as their halides, nitrates, sulfates, acetates, etc. Easily hydrolyzed salts can be kept in solution without decomposition by employing the appropriate inorganic acid; for example, sulfuric acid for tin sulfate, hydrochloric acid for tin chloride, etc. Well-known procedures for drying and calcination of the catalysts may be employed also; for example, vacuum drying and calcination in an oxidative, neutral or reductive atmosphere at temperatures of about 800 to 1200° F.

The active hydrogenation-dehydrogenation metal can be used in amounts of about 1 to 20 percent by weight of the finished catalyst and the total amount of promoting metals includes about 1 to 15 percent based on the weight of the finished catalyst.

A number of tests using various catalyst compositions of our invention were made and compared with several presently used commercial catalysts. One of the commercial catalysts, Run No. 1, was used as a reference base in evaluating the data obtained, to compare the amount of unwanted hydrogenation of naphthalene as well as the amount of desired desulfurization and denitrogenation. The feedstock utilized consisted of 40 volume percent of a coal tar methylnaphthalene concentrate containing a mixture of alkylbenzenes, naphthalene, 1-, 2-, and dimethylnaphthalenes, styrene and indenes and 60 volume percent of a coal tar light oil containing 4180 p.p.m. of sulfur and 900 p.p.m. of nitrogen in the form of sulfur and nitrogen compounds respectively as well as benzene, toluene, xylene and $C_5$ and $C_6$ olefins and diolefins. Each test was conducted at a temperature of 700° F., a pressure of 600 p.s.i.g., a LHSV of 2, a hydrogen gas to hydrocarbon hydrogen ratio of 5/1. Results of all tests are presented in the following table. The compositions of the catalysts are given in percent by weight of each component in each catalyst composition.

| Run No. | Catalyst composition | Relative rates [1] | | |
|---|---|---|---|---|
| | | Hydrogenation | Desulfurization | Denitrogenation |
| Commercial catlysts | | | | |
| 1 | Ni, Mo, $Al_2O_3$(AC) | 100 | 100 | 100 |
| 2 | Co, Mo, $SiO_2$, MgO | 130 | 98.5 | 99.6 |
| 3 | Co, Mo, $SiO_2$, $Al_2O_3$ | 84 | 100 | 92.4 |
| 4 | Co, W, $Al_2O_3$ | 123 | 99.8 | 98.5 |
| 5 | Ni, Mo, $Al_2O_3$ | 133 | 100 | 100 |
| 6 | Ni, Mo, Ca, $Al_2O_3$ | 123 | 99.4 | 98.2 |
| 7 | Co, Mo, $Al_2O_3$ | 89 | 100 | 99.6 |
| Catlysts of this invention | | | | |
| 8 | 1% Pd, 4% SnO, 95% $Al_2O_3$ | 31 | 96 | 69 |
| 9 | 1% Pt, 4% SnO, 95% $Al_2O_3$ | 0.4 | 77 | 19.5 |
| 10 | 1% Rh, 4% SnO, 95% $Al_2O_3$ | 0.9 | 80.5 | 37.3 |
| 11 | 1% Pt, 1% Re, 4% SnO, 94% $Al_2O_3$ | 8 | 93.0 | 80.4 |
| 12 | 0.6% Pt, 1.2% SnO, 98.2% $Al_2O_3$ | 14 | 93.3 | 78.8 |
| 13 | 1% Re, 4% SnO, 95% $Al_2O_3$ | 10 | 54 | 78 |
| 14 | 1% Re, 2% SnO, 97% $SiO_2$ and $Al_2O_3$ | 1 | 47 | 50 |
| 15 | 1% Re, 0.5% SnO, 98.5% $SiO_2$, and $Al_2O_3$ | 42 | 96 | 100 |
| 16 | 6% W, 6% $V_2O_5$, 4% SnO, 84% $Al_2O_3$ | 0.5 | 31 | 19 |
| 17 | 5% $V_2O_5$, 10% SnO, 85% $Al_2O_3$ | 0.7 | 26 | 11 |
| 18 | 1% Re, 6% $V_2O_5$, 2% SnO, 91% $Al_2O_3$ | 31 | 92 | 99 |
| 19 | 10% $V_2O_5$, 4% SnO, 86% $Al_2O_3$ | 2 | 80 | 53 |
| 20 | 4% Ni, 10% Mo, 4% SnO, 82% $Al_2O_3$ | 57 | 99.3 | 77 |
| 21 | 3% Co, 12% Mo, 4% SnO, 81% $Al_2O_3$ | 80 | 100 | 86 |
| 22 | 10% $V_2O_5$, 2% ZnO, 88% $Al_2O_3$ | 7 | 97.8 | 49 |
| 23 | 1% Pt, 4% ZnO, 95% $Al_2O_3$ | 30 | 100 | 87 |
| 24 | 1% Re, 6% $V_2O_5$, 2% ZnO, 91% $Al_2O_3$ | 15 | 80 | 73 |
| 25 | 1% Pt, 1% Re, 2% ZnO, 96% $Al_2O_3$ | 47 | 98.3 | 99.5 |
| 26 | 1% Re, 4% ZnO, 95% $Al_2O_3$ | 20 | 92.3 | 98.1 |
| 27 | 12% Mo, 2% $K_2O$, 4% SnO, 82% $Al_2O_3$ | 42 | 90 | 94 |
| 28 | 5% Ni, 2% $K_2O$, 4% SnO, 89% $Al_2O_3$ | 3 | 88 | 26 |
| 29 | 12% $V_2O_5$, 2% $MnO_2$, 86% $Al_2O_3$ | 8 | 88 | 64 |
| 30 | 5% CuO, 5% ZnO, 10% $Cr_2O_3$, 80% $SiO_2$, and $Al_2O_3$ | 9 | 83 | 40 |
| 31 | 5% CuO, 5% ZnO, 10% $V_2O_5$, 80% $SiO_2$, and $Al_2O_3$ | 16 | 85 | 62 |
| 32 | 12% $Cr_2O_3$, 4% $Cs_2O$, 84% $Al_2O_3$ | 5 | 76 | 65 |
| 33 | 4% Ni, 10% $Cr_2O_3$, 4% SnO, 82% $Al_2O_3$ | 5 | 74 | 59 |

[1] To be compared with a value of 100 assigned to commercial catalyst, Sample No. 1.

A review of the preceding data readily indicates the improvement represented by our process over presently used commercial catalysts. The rate of undesirable hydrogenation of naphthalene resulting in Runs 1 through 7 from the use of commercial catalysts is substantially greater than the rate of hydrogenation resulting from the use of our improved process in Runs 8 through 33. The relative rates of desulfurization and denitrogenation in Runs 8 through 33 remained acceptably high.

When reference is made herein to the Periodic System of elements, the particular groupings referred to are as set forth in the Periodic Chart of the Element in "The Merck Index," Seventh Edition, Merck & Co., Inc., 1960.

What is claimed is:

1. A process for the hydrogenation-hydrotreating of hydrocarbon mixtures comprising contacting said hydrocarbon mixtures in the presence of hydrogen gas with a catalyst consisting essentially of about 1 to about 20 percent by weight of at least one metal selected from Group VB of the Periodic System, about 1 to about 15 percent by weight of at least one metal selected from Group IIA of the Periodic System, and the remainder alumina as an inert support, under conditions sufficient to effect said hydrogenation-hydrotreating.

References Cited

UNITED STATES PATENTS

| | | | |
|---|---|---|---|
| 2,500,146 | 3/1950 | Fleck et al. | 208—243 |
| 3,258,431 | 6/1966 | Fisher et al. | 208—143 |
| 3,328,477 | 6/1967 | Taylor et al. | 208—143 |
| 3,494,857 | 2/1970 | McIlvried et al. | 208—143 |
| 3,383,305 | 5/1968 | Rogers et al. | 208—143 |
| 3,368,875 | 2/1968 | Tulleners | 208—143 |
| 3,383,306 | 5/1968 | Rogers et al. | 208—143 |

HERBERT LEVINE, Primary Examiner

U.S. Cl. X.R.

208—213, 216, 217, 254 H; 252—461, 464, 465, 466, 473, 474, 475, 476